United States Patent [19]

Woo et al.

[11] Patent Number: 5,781,788
[45] Date of Patent: Jul. 14, 1998

[54] FULL DUPLEX SINGLE CLIP VIDEO CODEC

[75] Inventors: Beng-Yu Woo, Los Altos Hills, Calif.; Xiaoming Li, Yorktown Heights, N.Y.; Vivian Hsiun, Palo Alto, Calif.

[73] Assignee: AVC Technology, Inc., Cupertino, Calif.

[21] Appl. No.: 939,997

[22] Filed: Sep. 29, 1997

Related U.S. Application Data

[63] Continuation of Ser. No. 437,276, May 8, 1995, abandoned.
[51] Int. Cl.$^6$ .................................................. G06F 13/00
[52] U.S. Cl. .................... 395/800.01; 370/276; 370/278; 370/282; 364/DIG. 1
[58] Field of Search ................ 395/800.01; 370/276, 370/278, 282; 364/DIG. 1

[56] References Cited

U.S. PATENT DOCUMENTS

| | | | |
|---|---|---|---|
| 5,367,629 | 11/1994 | Chu et al. | 395/162 |
| 5,379,351 | 1/1995 | Fandrianto et al. | 382/41 |
| 5,457,780 | 10/1995 | Shaw et al. | 395/165 |
| 5,541,640 | 7/1996 | Larson | 348/19 |
| 5,543,939 | 8/1996 | Harvey et al. | 395/426 |

*Primary Examiner*—Daniel H. Pan
*Assistant Examiner*—Dzung C. Nguyen
*Attorney, Agent, or Firm*—Thomas E. Schatzel; Law Offices of Thomas E. Schatzel A Prof. Corporation

[57] ABSTRACT

A single-chip video compression/decompression (video codec) chip is connected to receive a video input from a NTSC-compatible or PAL-compatible camera and a transmit channel. Video information from the camera or other video input source is compressed by the video codec and transmitted out in compressed form on a transmit channel. Concurrently, compressed video information is input to the video codec from a receive channel, decompressed and output to the monitor or other video output device, e.g., a television set. Only a separate single module of dynamic random access memory (DRAM) is needed to provide storage for incoming and outgoing video data, compressed bit streams and reconstructed pictures for both compression and decompression procedures. The compression of video information is by spatial decorrelation of the intraframe information, and temporal decorrelation of the interframe information. The communication channel bit rate is further reduced by quantization and variable length coding. Intraframe coding uses the redundancy of information within a single frame. The processing is done on blocks of eight-by-eight pixels. Both the luminance and chrominance pixel blocks are transform coded by a discrete cosine transform that changes the pixels from spatial domain to frequency domain.

12 Claims, 8 Drawing Sheets

Fig. 4B

|  | IF | IF | IF | IF | IF |
|---|---|---|---|---|---|
| Load | IM Read | I Decode | DAR <- immediate | DM Read | r <- DBR |
| Load(I) | IM Read | I Decode |  |  | r <- immed. |
| Store | IM Read | I Decode | DAR <- immediate<br>DBR <- r | DM Write |  |
| ALU | IM Read | I Decode | alu = func(rt,rs) |  | rt <- alu |
| Jmp | IM Read | I Decode | alu = condition | PC <- immed. |  |

FULL DUPLEX SINGLE CLIP VIDEO CODEC

This application is a continuation of application Ser. No. 08/437,276 filed on May 8, 1995 now abandoned.

BACKGROUND OF THE INVENTION

1. Field of the Invention

The invention relates generally to semiconductor devices and video circuitry and more specifically to single-chip video compression/decompression processors (video codecs) with digital data compression capabilities sufficient to sustain video conferencing over long distance telephone connections. Further applications include interactive multimedia, audio-visual conferencing system, video telephone and remote video data-base retrieval. The international telephone union (ITU) has defined a group of standards for visual telephone applications which are collectively known to artisans as "Px64". Such standards promise type-inter-operability among different videophone manufacturers' commercial products.

2. Description of the Prior Art

Television comprises video signals that describe the hue, color saturation and luminance of every picture element (pixel) in a frame at a basic frame rate of thirty frames per second (fps). Each frame can have close to one thousand raster lines each with one thousand individual pixels (720 active pixels per line). Therefore every frame can comprise close to one million pixels. Since thirty fps are typically scanned, close to thirty million pixels per second would ordinarily need to be transmitted from a video camera to a monitor.

Digital compression and motion prediction techniques can drastically reduce the required video channel bandwidth. Motion prediction techniques encode motion vectors and compare the last frame sent, motion-compensated, to the current frame and take the difference. Then only the motion vectors and the difference are transmitted. Obviously for picture subjects that do not move much, such as "talking heads" in video conferencing, the difference information can fall to near zero and an ordinary telephone line could be used to handle the resulting signal bandwidth.

Although video industry standards specify data formats, frame structures, procedures for establishing connections and recovery from fault conditions, they do not specify how to pre-filter and post-filter pictures, mode criteria for skip frames etc., motion estimation for search window, method, cost function, and step-size determination for quantization. The International Telephone Union (ITU) has produced a so-called industry standard, "Px64", within which there is an item "H.261", comprising a recommendation for a video codec. The exchange data format is specified such that audiovisual teleservices vendors can follow this format to decode compressed information.

Fandrianto, et al., describe in U.S. Pat. No. 5,379,351, issued Jan. 3, 1995, video compression and decompression (codec) processing and processors. Such patent is incorporated herein by reference. A vision processor is described that has both motion estimation and discrete cosine transform functions, e.g., in a chip set. The motion estimation part includes an image memory and a search memory with each memory having a write port and two read ports. For motion vector searching, an arithmetic logic unit (ALU) does averaging and difference operations on pixels in the frame and search memories.

SUMMARY OF THE PRESENT INVENTION

It is therefore an object of the present invention to provide a single-chip video codec for simultaneous encoding/decoding up to full Px64 resolution at thirty frames per second of completely asynchronous full-duplex transmit and receive channels.

It is another object of the present invention to provide a single-chip video codec with on-chip clock generator which generates operating frequencies as high as 27 MHz, 40.5 MHz, 54 MHz, 67.5 MHz and 81 MHz.

It is an object of the present invention to provide a single-chip video codec for thirty frames per second common intermediate format (CIF), with 288 lines with 352 pixels per line, and quarter CIF (QCIF), with 144 lines with 176 pixels per line, coding and decoding.

It is another object of the present invention to provide a single-chip video codec with on-chip error handling capability, programmable buffer control, and a flexible user interface with on-chip programmable registers that are both readable and writable, allowing spatial and temporal resolution selection and channel-rate selection.

It is a still further object of the present invention to provide a single-chip video codec with a dynamic random access memory (DRAM) on-chip controller and interface that allows the use of low cost memory system of external DRAMs.

It is another object of the present invention to provide a single-chip video codec with a video interface, host interface and interfaces to time-division-multiplexed channels.

It is an object of the present invention to provide a single-chip video codec with an on-chip processor to execute both parallel and pipelined operations.

Briefly, a video codec embodiment of the present invention comprises video compression and decompression processors, and single-chip architectures for intra-frame coding/decoding, discrete cosine transform, inter-frame coding and decoding, motion estimation, motion-compensated prediction, quantization, variable length coding and decoding and error detection and correction, and frame synchronization. Full-duplex video data bitstreams are simultaneously encoded and decoded with shared resources.

An advantage of the present invention is that a single-chip video codec is provided for simultaneous encoding/decoding of completely asynchronous full-duplex transmit and receive channels.

Another advantage of the present invention is that a single-chip video codec with on-chip clock generator which generates operating frequencies as high as 27 MHz, 40.5 MHz, 54 MHz, 67.5 MHz and 81 MHz.

A further advantage of the present invention is that a single-chip video codec is provided for thirty frame per second CIF and QCIF coding and decoding.

An advantage of the present invention is that a single-chip video codec is provided with on-chip error handling capability, buffer control, and a flexible user interface with on-chip programmable registers that are both readable and writable.

Another advantage of the present invention is that a single-chip video codec is provided with a DRAM interface that allows the use of low cost memory system of external DRAMs.

It is another advantage of the present invention that a single-chip video codec is provided with a video interface, host interface and interfaces to time-division-multiplexed channels.

It is an advantage of the present invention that a single-chip video codec is provided with an on-chip processor to execute both parallel and pipelined operations.

IN THE DRAWINGS

FIG. 4B is a diagram of the five-stage pipelining operation of the CPU of FIG. 4A;

DETAILED DESCRIPTION OF THE PREFERRED EMBODIMENTS

Figure 1:
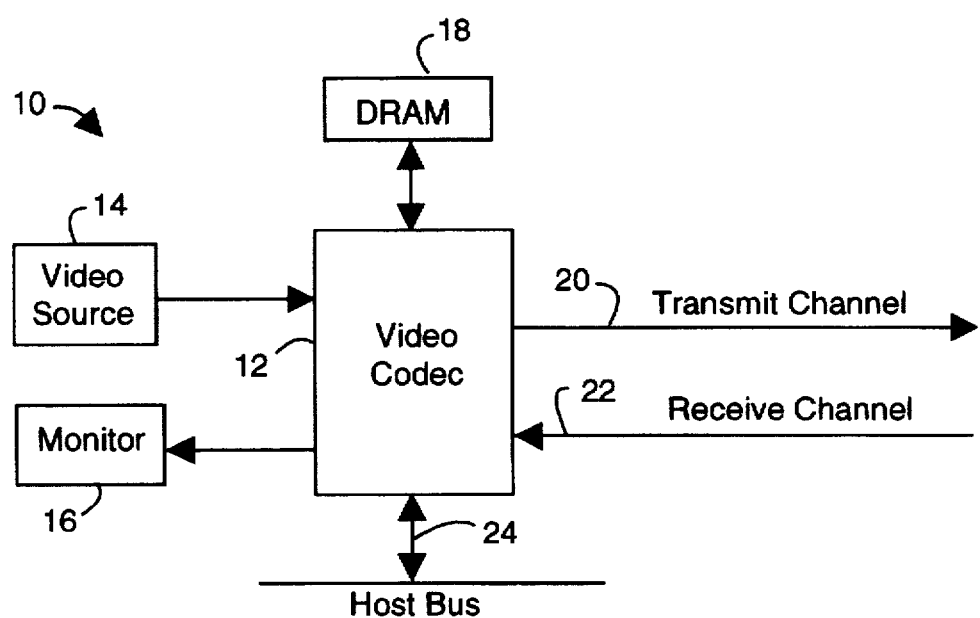
FIG. 1 is a block diagram of a single-chip video codec of the present invention shown in a system with DRAM, video input, video output, host and communication channel connections.

FIG. 1 illustrates a video system embodiment of the present invention, referred to by the general reference numeral 10. A single-chip video compression/decompression (video codec) chip 12 is connected to receive a video input from a NTSC-compatible or PAL-compatible camera 14 and a monitor 16. ("NTSC" and "PAL" are respective television-broadcast standards used in the United States and Europe.) A separate dynamic random access memory (DRAM) 18 provides storage for incoming and outgoing video data. Video information from the camera 14 or other video input source is compressed by the video codec 12 and transmitted out in compressed form on a transmit channel 20. Conversely, compressed video information is input to the video codec 12 from a receive channel 22, decompressed and output to the monitor 16 or other video output device, e.g., a television set.

The compression of video information is by spatial de-correlation of the intraframe information, and temporal decorrelation of the interframe information. The communication channel bit rate is further reduced by quantization and variable length coding.

Intraframe coding uses the redundancy of information within a single frame. The processing is done on blocks of eight-by-eight pixels. Both the luminance and chrominance pixel blocks are transform coded by a discrete cosine transform that changes the pixels from spatial domain to frequency domain.

The transform coefficients are then arranged in the order of increasing frequency, e.g., in zigzag fashion, to prepare for run-length coding. A quantizer with adjustable threshold is used to increase the zero run to enhance the coding efficiency. This threshold is determined by the stepsize, which can only be changed every eleven macroblocks. The policy of changing stepsize is not specified in the important industry standards. However, it can be related to how full the transmit buffer is. In order to emulate the behavior of the decoder, the frame is reconstructed using the inverse quantization, inverse zigzag operation, inverse discrete cosine transform. Intraframe compression can achieve a compression ratio of about 20:1. In order to have a higher compression ratio, interframe compression is done taking advantage of the fact that adjacent frames are highly correlated temporally. Motion estimation uses two sequential frames, and motion vectors are then included in the encoded bit stream.

For interframe pictures, the macroblocks for the current frame at time "t" are compared with the macroblocks of the previous frame "t−1". The displacement vector within a defined search window (a maximum of $46^2$ in H.261) that provides a minimum cost function which can be as simple as an absolute difference is the motion vector. This motion vector is encoded by variable length coding. Motion estimation is provided for luminance data only. Motion vectors for the chrominance data is one-half of that for luminance data, for a particular macroblock of four luminance blocks and two chrominance blocks. The frame at "t−1" is motion-compensated using newly-computed motion vectors for both luminance and chrominance. A motion-compensated frame "t−1" passed through an optional loop filter, is compared with a current frame "t". The difference between a current frame "t" and a reconstructed frame "t−1" is discrete-cosine-transform encoded, processed for zigzag and quantizer, and decoded with the inverse functions. The decoded differences are added to motion-compensation to form a reconstructed current frame that is used for a motion estimation of the next frame "t+1".

As to be expected, decoding is the opposite of encoding. The bit stream is error detected and corrected, when error control is enabled. Since the data is variable-length coded, the length of each code-word is determined, segmented and decoded. From the decoded data, the frame start, group-of-block start and macroblock start are used to trigger various parts of the video codec 12. Within a macroblock, if it is type-intra, it is decoded using inverse zigzag, inverse quantizer and inverse discrete cosine transform and is sent out and stored in the frame memory in DRAM 18. If it is type-inter, the decoded motion vector is used to motion-compensate the macroblock in a previous frame "t−1". At the same time, the differences between "t" and "t−1" are decoded using inverse quantizer, zigzag and discrete cosine transform. These decoded differences, are added to a motion-compensated macroblock, to reconstruct macroblock for the current frame "t". The re-constructed macroblock is the output of the decoder and is stored in the frame memory in DRAM 18 for reconstructing the next frame "t+1".

Figure 2:
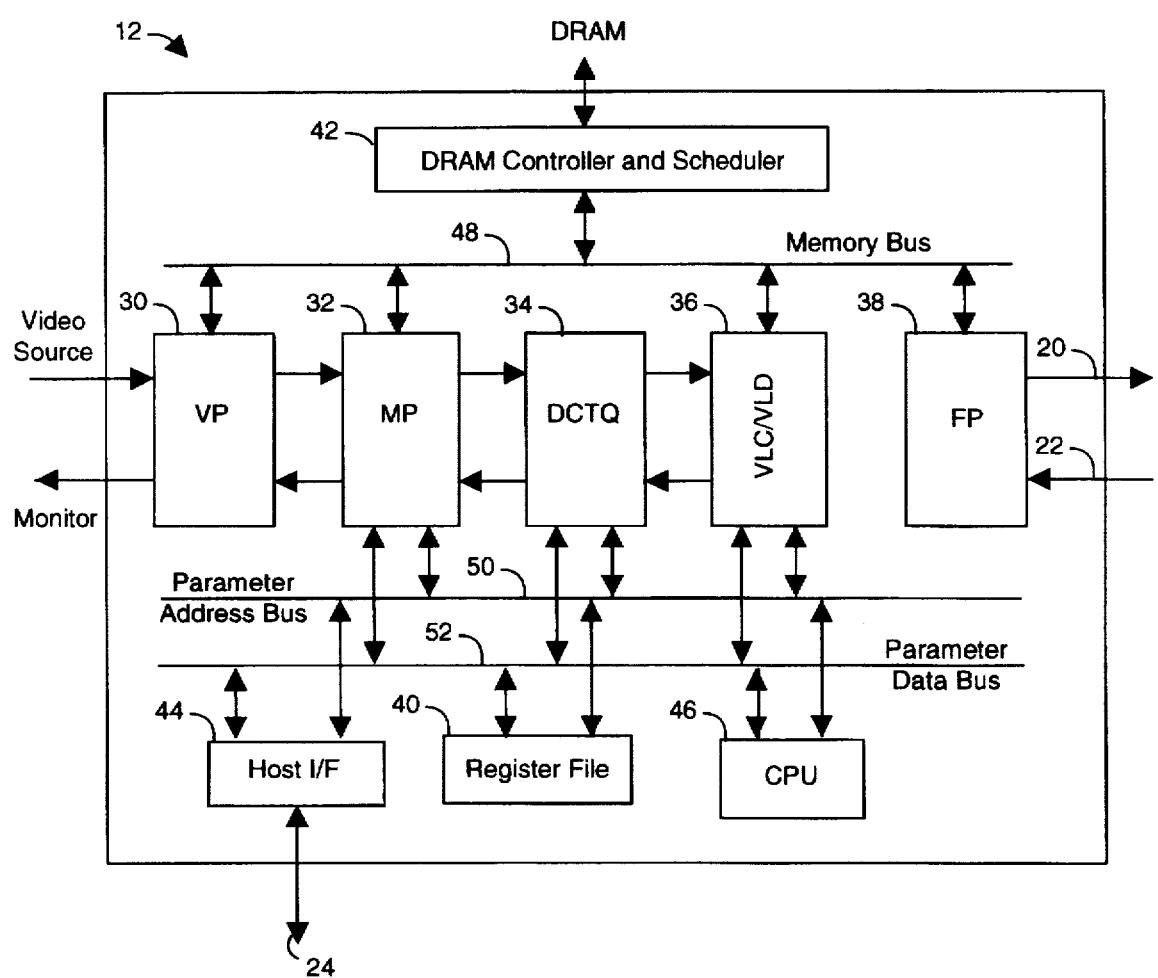
FIG. 2 is a block diagram of the codec of FIG. 1 showing the internal functional parts that are implemented with a combination of hardware and firmware.

As shown in FIG. 2, the video codec 12 processor comprises a video input/output buffer 30, a motion prediction processor 32, a discrete cosine transform and quantization block 34, a variable-length coder and decoder 36, a framing processor 38, a register file 40, a DRAM controller and scheduler 42, a host interface 44, and a microcomputer (CPU) 46.

The video input/output buffer (VP) 30 is such that the incoming pixels are buffered and stored in the external DRAM 18 for raster-scan-to-block conversion. Macroblocks of such pixel data are fetched and used for discrete cosine transform in intra-frame compression and for motion-estimation in inter-frame compression in the motion prediction processor (MP) 32.

The discrete cosine transform and quantization (DCTQ) block 34 provides for discrete cosine transform, zigzag conversion and quantization, both forward and inverse. For discrete cosine transforms, dedicated logic is used to do row and column transformations. Bits in the intermediate result are preserved for output coefficient precision that exceeds the ITU and IEEE standard requirements. Quantization logic makes the trade-off between spatial and temporal resolutions. Saturation logic is included to prevent overflow.

The quantized discrete cosine transform coefficients are sent to the variable length coder and decoder (VLC/VLD) 36. Run-length and variable-length Huffman coding are done. The inverse is provided for the decoder. Picture headers and macro-block headers are added to the video data and errors are attended.

In the framing processor (FP) 38, a BCH (511, 493) forward error correction code is generated for inclusion in the transmitted bit stream. The encoder includes an error correction framing pattern. In the decoder, relock timing for the error corrector framing is re-established when lock is lost.

The register file 40 allows users to control the operations of the video codec 12, to adjust its parameters for specific applications, and to interrogate the status of operations and to monitor the behavior of the internal coding/decoding processes.

The DRAM controller 42 manages access to the frame buffer and the transmit/receive buffer. It schedules memory cycles for the encoder and decoder. In addition, users can set the sizes of encoding and decoding frame buffers, as well as the transmit and receive buffers.

The host interface 44 controls access to and from the host bus 24. The CPU 46 coordinates multiple pipelined and concurrent operations within the video codec 12, making sure that important resources are ready during the timing slot opportunities for a particular data stream and routing of the data.

Within the video codec 12, there are several busses for transferring data, address and control/parameters, an internal memory data (IMD[31:0]) bus 48, an internal parameter address (IPA[4:0]) bus 50, and an internal parameter data (IPD[4:0]) bus 52.

Figure 3:
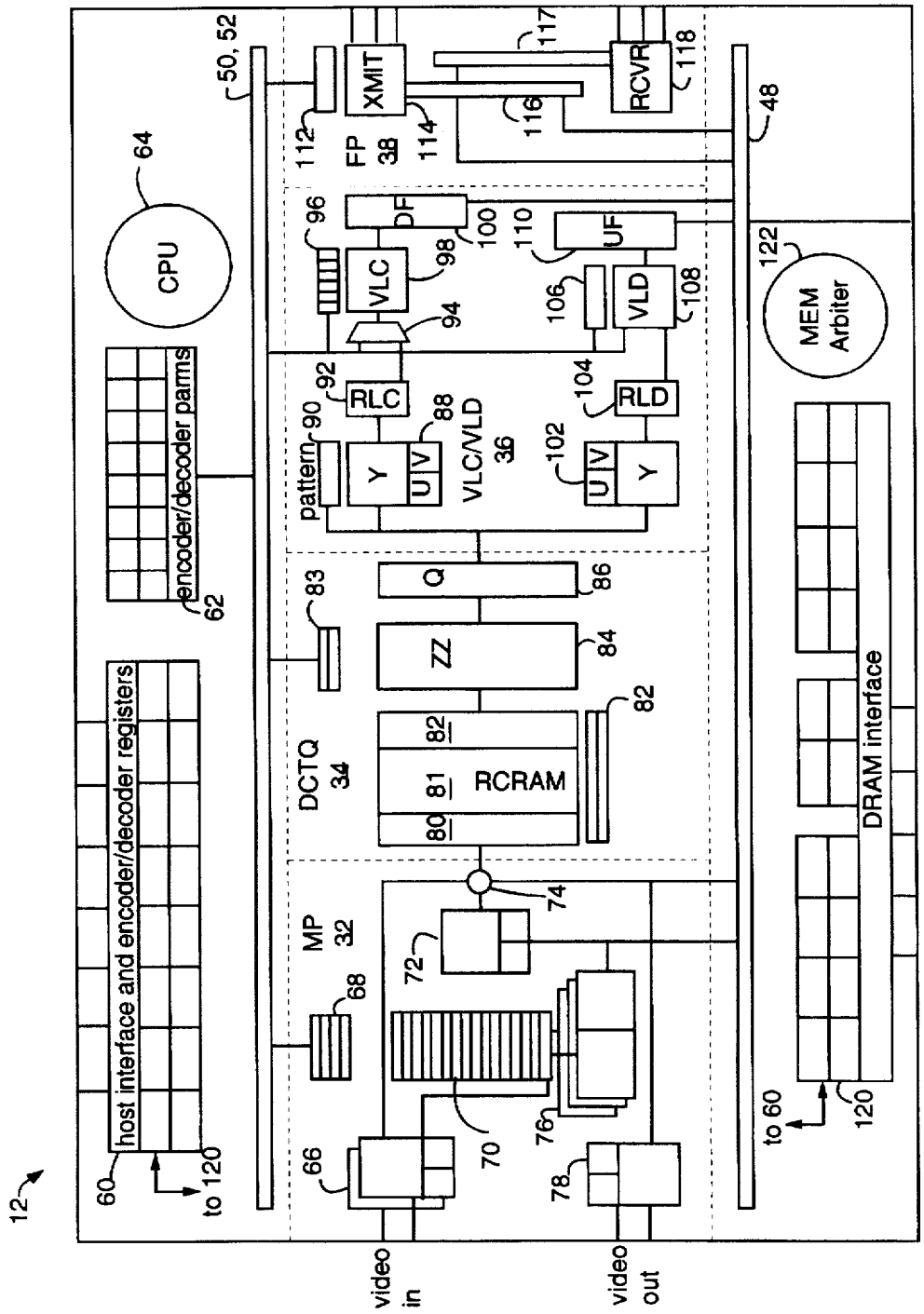
FIG. 3 is a more detailed block diagram of the single-chip video codec of FIG. 2.

FIG. 3 shows the video codec 12 in more detail than FIG. 2. A set of encoder and decoder general registers 60 are interfaced to the host interface bus 24. A set of encoder and decoder parameter registers 62 are connected to the internal parameter address and data buses 50 and 52. A coding, control and sequencer 64 provides overall management of the resources of the video codec 12. For example, the coding, control and sequencer 64 coordinates the bitstream compression and decompression process.

The motion processor 32 comprises a current macroblock buffer 66 that receives video input from a local source. A motion processor parameter register 68 accepts control information, e.g., from the host via the host interface 24 and parameter buses 50 and 52. An array of sixteen processors 70 selects a best match macroblock 72 and has an output connection to an adder subtractor 74. A search window 76 contains several macroblocks that are operated on by the processor array 70. The parameters provide programmable weights in calculating the cost function of motion estimation so that the motion vectors selection and inter/intra decisions can be influenced by users. A video output, e.g., to the monitor 16, is provided from a reconstructed macroblock 78.

When encoding, the motion predictor 32 computes the difference between two sequentially-adjacent video frames and supplies a frame-difference data, instead of the frame itself, to the DCTQ 34. Any temporal redundancy, where two time-sequential frame elements are repeated, is thus removed from the video frame, and a lower bit rate results. Reconstructed frames are used for predicting a next frame, e.g., from the frame prediction plus the transmitted frame difference.

When decoding, the motion predictor 32 reconstructs each video frame by adding a received-frame difference to a frame prediction based on previous reconstructed frames. The motion predictor 32 processes the main bitstreams between the video input/output ports and the forward/inverse discrete cosine transform transformers. The encoding process is activated by a video input macroblock start signal. The decoding process is activated by a signal from the DCTQ 34.

For full-duplex thirty frame-per-second CIF video streams and assuming a clock frequency of fifty-four MHz, the motion predictor 32 must process a macroblock for the encoding channel and a macroblock for the decoding channel in $54*10^6/(30*396)=4545$ clock cycles (T)=one macroblock cycle (MT). The encoding operations consist of motion estimation, type-intra/type-inter decision, loop filtering, motion-compensated prediction, and feedback reconstruction, while the decoding operations consist only of the reconstruction with optional loop filtering. The number of computations required for the motion estimation for one macro-block is $16^4=65,536$ subtract-magnitude-accumulates for a full search.

The motion predictor 32 uses a two-stage pipelined approach. In a given macroblock cycle, while encoding frame prediction and decoding reconstructions are being done for a current set of macroblocks (both encoding and decoding), the motion estimation is done for a next macroblock (encoding only). The motion estimation depends on processor array 70 for a full search. This dedicated processor array breaks down a macroblock motion estimation theoretically to 4096 T, assuming each processor computes a subtract-magnitude-accumulate in a single clock cycle "T". In encoding the macroblock, prediction and reconstruction are simultaneous, so the adder/subtractor 74 includes independent subtractor and adder functions. The adder part of adder/subtractor 74 is shared in decoding reconstruction. The workload of the adder part of adder/subtractor 74 is estimated by $64*6*2=768$ T, and the workload of the adder is about 1536 T, since they both process each pixel in every two clock cycles. Loop filtering follows loading of the matched previous macroblock into its buffer and is shared between encoding and decoding, e.g., for $64*6*2=768$ T.

Various data rates can be interfaced to the video input/output ports. The discrete cosine transform transformers use two cycle-per-byte bursts. Supporting memory buffers are used for the current encoding macroblock, the current reconstructed macroblock, and the matched previous macroblock. This requires a minimum memory burst bandwidth of one byte every two clock cycles for the 32-bit DRAM controller 42. To be able to use a whole macroblock cycle for estimating a macroblock, both the current frame macroblock and the previous frame search window are double buffered. A motion estimation is done for one macroblock in its search window. The next macroblock and its search window are fetched from DRAM 18 into the buffers 76 for next macroblock estimation. Because the search windows of two adjacent macroblocks overlap by sixteen pixels, the left half of the search window is obtained by shifting from the right half. Only the right half of a search window needs be fetched from DRAM 18. Ping-pong switching provides for the double buffering and window shifting. The memory traffic requirement in a macroblock cycle comprises 256*2=512 byte reads for the next motion estimation, 64*2=128 byte reads for encoding prediction, 384 byte writes for encoding reconstruction, 384 byte reads for decoding prediction, and 384 byte writes for decoding reconstruction. The total memory traffic is 1024 byte memory reads and 768 byte memory writes through the internal memory data IMD[31:0] bus 48 in each macroblock cycle.

The motion predictor 32 communicates with the CPU 46 through the IPA[4:0] bus 50 and the IPD[7:0] bus 52 and uses separate registers in register files 60 and 62 for encoding and decoding. When writing, a first register specifies guidance information of the next macroblock processing. When writing, the first register specifies the status information of the previous just processed macroblock. Other registers specify the location information of the next (previous) macroblock.

As shown in FIG. 3, the DCTQ 34 includes a first dimension (row) processor 80, a row/column RAM (RCRAM) 81, and a second dimensional (column) processor 82. A DCTQ parameter register 83 is connected to the parameter address and data buses 50 and 52. A state machine 84 drives the processors 80 and 82. A zigzag (ZZ) unit 84 and a quantizer (Q) 86 complete the DCTQ 34. The DCTQ 34 is host-programmable by virtue of the parameter register 83, which allows for adaptive quantization and rate buffer control. This provides for the optimization of a variety of applications in different environments. In essence, problematic portions of each frame susceptible to compression artifacts are favored with a disproportionate share of the compressed bitstreams, thereby reducing compression-artifact generation. DCTQ 34 includes high-speed algorithm specific processors that compute both the two-dimensional forward and inverse discrete cosine transform over eight-by-eight data blocks.

In a forward discrete cosine transform mode, the DCTQ processor 34 accepts each image data block in row-major format at two clock cycles per pixel. In an inverse discrete cosine transform mode, the DCTQ processor 34 accepts column-major format and return row-major data at two clocks cycles per pixel. In both modes, the processor 34 operates on continuous data at high rates.

Zigzag and quantization processing is placed downstream of forward discrete cosine transforms, and up-stream of inverse discrete cosine transforms. In forward (encoding) mode, the coefficients are re-ordered into a one-dimensional array by reading out the entries of the two-dimensional array along a zigzag route. Following such zigzag, the processing provides for variable threshold and quantization. In inverse mode, the coefficients are reconstructed and passed to the inverse discrete cosine transform process.

Each processor 80 and 82 includes arithmetic elements connected to the row-column memory 81. Each such arithmetic element includes a multiplier and two adders for computing an eight-point one-dimensional discrete cosine transform in sixteen clock cycles. The row-column memory 81 is preferably implemented as a two-port, sixty-four word RAM for re-arranging the data format, e.g., from an incoming eight-by-eight block to an output eight-by-eight block. In coding, the first arithmetic element 80 computes the discrete cosine transform of each consecutive row of eight pixels. The results are written into the RCRAM 81. After one dimensional transforms are computed, the second arithmetic element 82 computes the discrete cosine transform of each consecutive column, while the first arithmetic element 80 computes the discrete cosine transforms of the rows of the next block of data.

The zigzag memory 84 is a dual-port, sixty-four word RAM for reformatting data into a zigzag format for later run-length encoding. Zigzag scanning of the coefficients provides a string of coefficients from low to high frequency. After such a zigzag reordering, the data is processed by three functions through the quantizer 86. A variable threshold is created that helps set coefficients to zero and increase the "run" length. A quantization of the coefficients after threshold is processed. And the quantized coefficients are either clipped for an eight-bit range, or the de-quantized coefficients are clipped to a twelve-bit coefficient, depending on whether coding or decoding.

The VLC/VLD 36 includes a four luminance (Y) block and two chrominance (U and V) block buffer 88. Run length patterns are matched with a pattern detector 90. A run length coder (RLC) 92 is connected to a multiplexer (MUX) 94. Variable length coding parameters are stored in a register 96 for the control of a variable length coder (VLC) 98. A fist-in-first-out (FIFO) 100 communicates the coded macroblocks to the DRAM 18 via the data bus 48. A four luminance (Y) block and two chrominance block buffer 102 is connected to a run-length decoder (RLD) 104 on the receive side. Variable length decoding parameters are stored in a register 106 for the control of a variable length decoder (VLD) 108. A first-in-first-out (FIFO) 110 communicates the coded macroblocks to the DRAM 18 via the data bus 48.

The VLC/VLD 36 uses on-chip buffer 88 for storing a current macroblock of four luminance blocks and two chrominance blocks, the run-length coder (RLC) and the variable length coder (VLC). Such a macroblock buffer is necessary because the coded block pattern and type cannot be determined until a whole macroblock has been scanned.

Transform coefficients are input to VLC/VLD 36 from the DCTQ 34 at a rate of one coefficient every two clock cycles, first the four luminance and then the two chrominance blocks. These coefficients are stored in the buffer, and zero-crossings are counted.

Local memory and the DRAM controller 42 provide data transfer supports to the pipelined video codec operations on a macroblock cycle basis. The DRAM 18 is partitioned by the video codec 12 into four sections, (1) an encoder frame buffer (EFB), (2) a decoder frame buffer (DFB), (3) a transmission channel buffer (TCB), and (4) a reception channel buffer (RCB). The section start address and the section size in words or double-words are programmable, and the section start addresses must be at word and double-word boundaries respectively. All of the memory sections operate in a wrap-around fashion, wherein the read/write pointer automatically jumps back to the starting address after hitting the section's ending boundary. The order of data storage in each section is sequentially consistent with the H.261 standard and thus DRAM 18 is preferably a page-mode type to allow faster memory accesses.

The DRAM controller 42 responds with two sixteen block memory access requests in each macroblock cycle. The order is consistent with the parallel micro operations of the macroblocks. During each memory service, DRAM controller 42 fetches the starting address offsets, if needed, and the required number of memory transfers from the unit to be serviced. It then does memory address incrementing, and transfers a given number of words or double words between the local memory and the serviced unit. The DRAM controller 42 also provides all the ordinary housekeeping and interfacing conventionally necessary for commercially-available 64K, 128K, and 256K dynamic/static RAMs of either sixteen bit words or thirty-two-bit double words.

The framing processor (FP) 38 receives such macroblocks from the DRAM. A FP parameter register 112 controls the operation of a BCH coder 114. A pair of serializers/deserializers 116 and 117 provide format changes for the BCH coder 114 and a BCH decoder 118 that are connected to the transmit channel 20 and receive channel 22, respectively. The VLC/VLD 36 is not directly connected to the FP 38, data between them passes through the DRAM 18 first.

The DRAM controller and scheduler 42 is comprised of a set of DRAM control registers connected to the host interface 44 and a memory arbiter 122.

In operation, an encoder read access is initiated by an input to the motion predictor 32 and an encoder read acknowledge is issued. At the start of service, the motion predictor 32 transfers macroblock location offsets and count information to the DRAM controller 42 through the IMD [31:0] bus 48. Then DRAM controller 42 sets up the block starting local memory address and transfers the given number of words or double words to the external DRAM 18.

The first encoder read access {er1} fetches 16×32 luminance pixels to form a right half of a search window, e.g., in search window 76. The frame boundary conditions are handled by the motion predictor 32. These 16×32 luminance pixels come across as six macroblocks stored in the frame buffer. The DRAM controller 42 accesses these six areas separately.

In pseudocode this can be implemented as follows,

```
initialize at second picture start ERA = encoder frame buffer starting
address
{efa};
At ERRQ1 do {
    issue ERAK1;
    repeat (4) {
        for (i=0to7) do {
            fetch from TMP=ERA-11H*384/4-16*8/4+16*i/4;
            fetch from TMP=ERA-11H*384/4+16*i/4;
        }
    }
    repeat (8) {
        for (i = 0 to 7) do {
            fetch from TMP = ERA - 16 * 8/4 + 16 * i/4;
            fetch from TMP = ERA + 16 * i/4;
        }
    }
    repeat (4) {
        for (i = 0 to 7) do {
            fetch from TMP=ERA+11H*384/4-16 *8/4+16*i/4;
            fetch from TMP=ERA+11H*384/4+16*i/4;
        }
    }
}
``` where, H=2 for CIF, and H=1 for QCIF, and H is the relative sub-sampling frequency.

A second encoder read access {er2} fetches the best matching two chrominance blocks after motion vectors are estimated to the best matching on-chip buffer. The motion predictor 32 guarantees that the two chrominance blocks are within the picture boundaries, and within the group of blocks in out implementation, and a smaller search window. To be consistent with the decoder read request design, this read request supports crossing group boundaries request and the standard 31 by 31 search window.

In pseudocode,

```
At ERRQ2 do {
    issue ERAK2;
    for (-my to 1) {
        for (j=|mx/4| to 1) do {
            fetch from TMP=ERA-(11H+1) * 384/4 +256+8* i/4+[j/4];
        }
        for (j=0 to [ (8+mx)/4]) do {
            fetch from TMP=ERA-(11H+1) * 384/4 +256+8* i/4+[j/4];
        }
        for (j=0 to [(8+mx)/4]) do {
            fetch from TMP=ERA-(11H+1) * 384/4 +256+8* i/4+[j/4];
        }
    }
    for (i=0 to my+8) {
        for (j=|mx/4| to 0) do {
            fetch from TMP=ERA-(+1) * 384/4 +256+8* i/4+[j/4];
        }
        for (j=0 to [ (8+mx)/4]) do {
            fetch from TMP=ERA-(0) * 384/4 +256+8* i/4+[j/4];
        }
        for (j=0 to [ (8+mx)/4]) do {
            fetch from TMP=ERA-(-1) * 384/4 +256+8* i/4+[j/4];
        }
    }
    for (i=0 to my+8) {
        for (j=|mx/4| to 0) do {
            fetch from TMP=ERA+(11H-1) * 384/4 +256+8* i/4+[j/4];
        }
        for (j=0 to [ (8+mx)/4]) do {
            fetch from TMP=ERA+(11H) * 384/4 +256+8* i/4+[j/4];
        }
        for (j=0 to [ (8+mx)/4]) do {
            fetch from TMP=ERA+(11H+1) * 384/4+256+8* i/4+[j/4];
        }
    }
    repeat all the above for V by adding TMP with 64;
    update ERA=ERA+384;
}
```

The encoder write {ew} is an access that stores one whole macroblock sequentially from the reconstruction adder into the encoder frame buffer.

In pseudocode,

```
Initialize at programming EWA = encoder frame buffer starting address
{efa};
At EWRQ do {
    issue EWAK;
    repeat (96) { store IMD[31:0] into mem[EWA]; EWA++ };
}
```

The decoder read {dr} is an access that fetches the best matching macroblock (both luminance and chrominances) to the on-chip best matching buffer. The pixels to-be-fetched flow across group boundaries. The search window size is 31×31. The chrominances are as specified in {er} with {dra} replacing {era}, while the luminance is fetched as follows in pseudocode,

```
At DRRQ do {
    issue DRAK;
    for (-my to 1) {
        for (j=|mx/4| to 1) do {
            fetch from TMP=ERA-(11H+1) * 384/4 + 16 * i/4+[j/4];
        }
        for (j=0 to [ (16+mx)/4]) do {
            fetch from TMP=ERA-(11H+1) * 384/4 + 16 * i/4+[j/4];
        }
        for (j=0 to [ (16+mx)/4]) do {
            fetch from TMP=ERA-(11H+1) * 384/4 + 16 * i/4+[j/4];
        }
```

11
-continued

```
}
for (i=0 to my+16) {
    for (j=[mx/4] to 0) do {
        fetch from TMP=ERA-(+1) * 384/4 +16 * i/4+[j/4];
    }
    for (j=0 to | (16+mx/4|) do {
        fetch from TMP=ERA-(0) * 384/4 +16 * i/4+[j/4];
    }
    for (j=0 to | (16+mx/4|) do {
        fetch from TMP=ERA-(-1) * 384/4 +16 * i/4+[j/4];
    }
}
for (i=0 to my+16) {
    for (j=[mx/4] to 0) do {
        fetch from TMP=ERA+(11H-1) * 384/4 +16 * i/4+[j/4];
    }
    for (j=0 to | (16+mx)/4|) do {
        fetch from TMP=ERA+(11H) * 384/4 +16 * i/4+[j/4];
    }
    for (j=0 to | (16+mx)/4|) do {
        fetch from TMP=ERA+(11H+1) * 384/4+16 * i/4+[j/4];
    }
}
}
```

The decoder write {dw} is an access that stores one whole macroblock sequentially from the reconstruction adder into the decoder frame buffer.

In pseudocode,

```
Initialize at programming DWA = decoder frame buffer starting address
{dfa};
At DWRQ do {
    issue DWAK;
    repeat (96) { store IMD[31:0] into mem[DWA]; DWA++ };
}
```

The transmission Read {tr} is an access that fetches 512 bits=16 double-words sequentially from transmission channel buffer to the transmission channel interface 20.

In pseudocode,

```
Initialize at programming TAR = transmission channel buffer starting
address {tea};
At TR do {
    issue TRAK;
    repeat (16) { fetch from mem[TAR] onto IMD[31:0]; TRA++ };
}
```

The reception read {tw} is an access that fetches 512 bits=16 double-words sequentially from the variable length coder into the transmission channel buffer.

In pseudocode,

```
Initialize at programming TWA = transmission channel buffer starting
address {tea};
At TWRQ do {
    issue TWAK;
    repeat (16) { store IMD[31:0] into mem[TWA]; TWA++ };
}
```

The reception read {read} is an access that fetches 512 bits=16 double words sequentially from reception channel buffer to the variable length decoder.

12

In pseudocode,

```
Initialize at programming RRA = reception channel buffer starting address
{rca};
At RRRQ do {
    issue RRAK;
    repeat (16) { fetch from mem[RRA] onto IMD[31:0]; RRA++ };
}
```

The reception write {rw} is an access stores 512 bits=16 double words sequentially from the reception channel interface into the reception channel buffer.

In pseudocode,

```
Initialize at programming RWA = reception channel buffer starting
address {rca};
At RWRQ do {
    issue RWAK;
    repeat (16) { store IMD[31:0] into mem[RWA]; RWA++ };
}
```

The refresh access {rf} is two refresh modes (RAS-only, CAS-before-RAS) that are supported by the DRAM controller 42, while the number of fresh clock cycles in each macroblock is programmable in RFC (should be the row length). The starting row address in also programmable, row first address (RFA) with default 0.

In pseudocode,

```
Initialize RFA = 0 and program RFC;
At every RFRQ do {
    repeat (RFC) { memory refresh read at RFA; RFA++ };
}
```

The host memory access {ha} is provided for debugging uses. The memory controller assumes the read and write accesses do not happen at the same time.

In pseudocode,

```
Initialize at programming HMA and HMC;
At HRRQ do {
    issue HRAK;
    repeat (HMC) { fetch mem[HMA] onto IMD[31:0]; HMA++ };
}
At HWRQ do {
    issue HWAK;
    repeat (HMC) { store IMD[31:0] into mem[HMA]; HMA++ };
}
```

For a single-chip implementation of the video codec 12, external connection pins should preferably be provided for a clock, a hardware or software reset, an eighteen-bit memory address bus, a thirty-two bit memory data bus, a row select address for DRAM row address strobe that latches the memory address into DRAM's row address registers, a column select address for DRAM column address strobe that latches the memory address into DRAM's column address registers, a memory read enable to activate the memory's output buffer, and a memory write enable to latch memory data into the memory cells selected.

Forward error correction by the decoder is recommended by H.261, but not required. The error correction code recommended is BCH (511, 493). Such code is capable of correcting any combination of two or fewer errors in a block of 511 bits, which include eighteen bits of correction parity bits. The generator polynomial of the galois field (GF) $(2^9)$ is:

$g(x)=(x^9+x^4+1) (x^9+x^6+x^4+x^3+1)$.

The video codec 12 includes a buffer control strategy for optimum picture quality which is determined by the number of bits in the buffer for the encoded picture, for a given channel rate and frame rate, where Rv is channel bit rate for video, f is frame rate (the user can assign the frame rate for the application), CIF is spatial resolution, whether CIF (352×288) or QCIF (176×144), LUT is look up table, and Tenc is encoder delay. For integrated services digital network (ISDN/BRI) the channel rate is 128K bits per second (bps), of which 96K bps of the bandwidth can be assigned to the video communication.

Within standard H.261, a reconstruction rule is given, but the rule of quantization is left to the implementation. However, the quantizer has the most impact on picture quality. A proper implementation of quantization reduces the artifacts introduced by compression.

The video codec 12 allows access by the user for the elimination of some undesirable artifacts such as quantizer overload. In the following pseudocode, "step" is the stepsize for the quantizer, "QUANT" is a parameter generated by the encoder, "T" is the threshold which defines the dead zone,

```
           step >= 2*QUANT; or
           step = 2 * a * QUANT
               where a > 1 and is a function of QUANT; and
           T = step + d
               where d > 0 (for example 0.5).
    If     x = input of quantizer, and
           y = output of quantizer
           then
    for x>T    y = max[trunc (x/step –d), 1];
    for x<–T   y = min[trunc (x/step + d), –1]; or
    else       y = 0
```

T, d can be normalized to step.

Figure 4A:
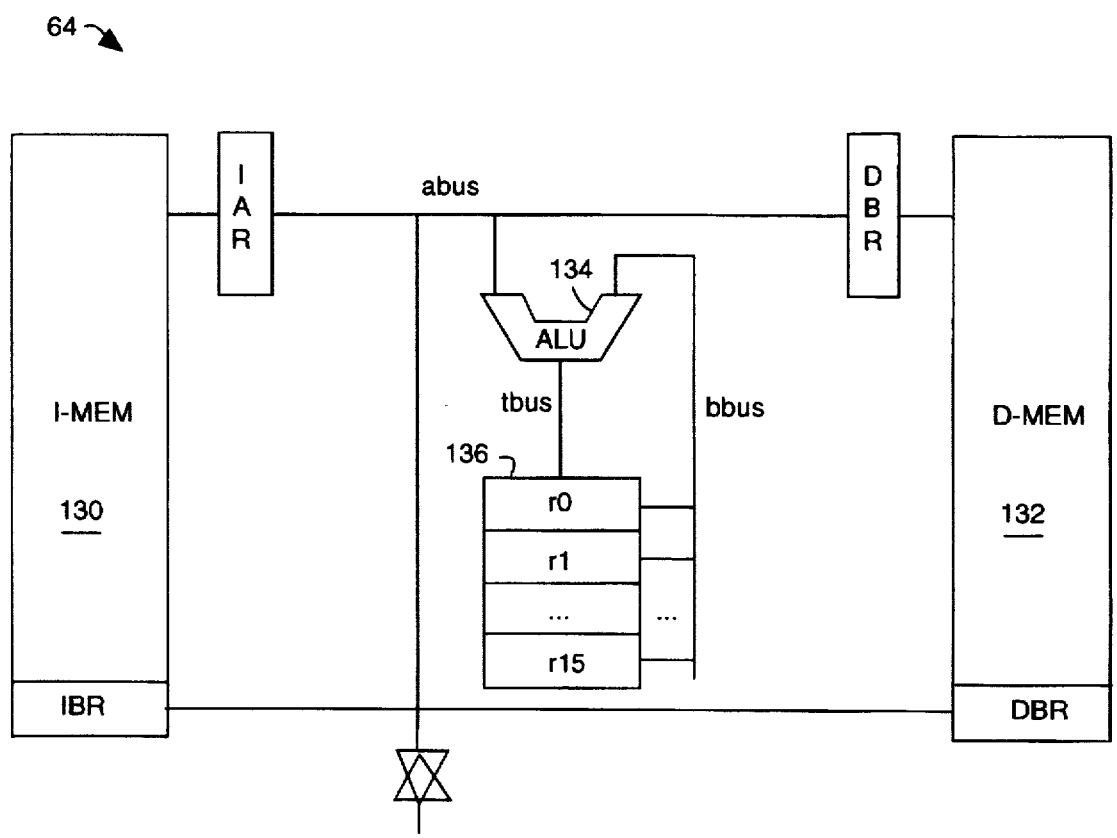
FIG. 4A is a block diagram of the CPU included in the video codec of FIGS. 2 and 3.

FIG. 4A shows an exemplary implementation of the coding control and sequencer 64, which includes an instruction memory bank 130 and a data memory bank 132, e.g., each 256×16, are connected to a sixteen-bit arithmetic logic unit (ALU) 134 and sixteen registers 136. Sixteen-bit instructions, each with three or four fields, provide load/ store, ALU, jump/branch operations and are five-stage pipelined, as represented in FIG. 4B. The coding control and sequencer 64 is roughly equivalent to the CPU 46 in FIG. 2.

Figure 5:
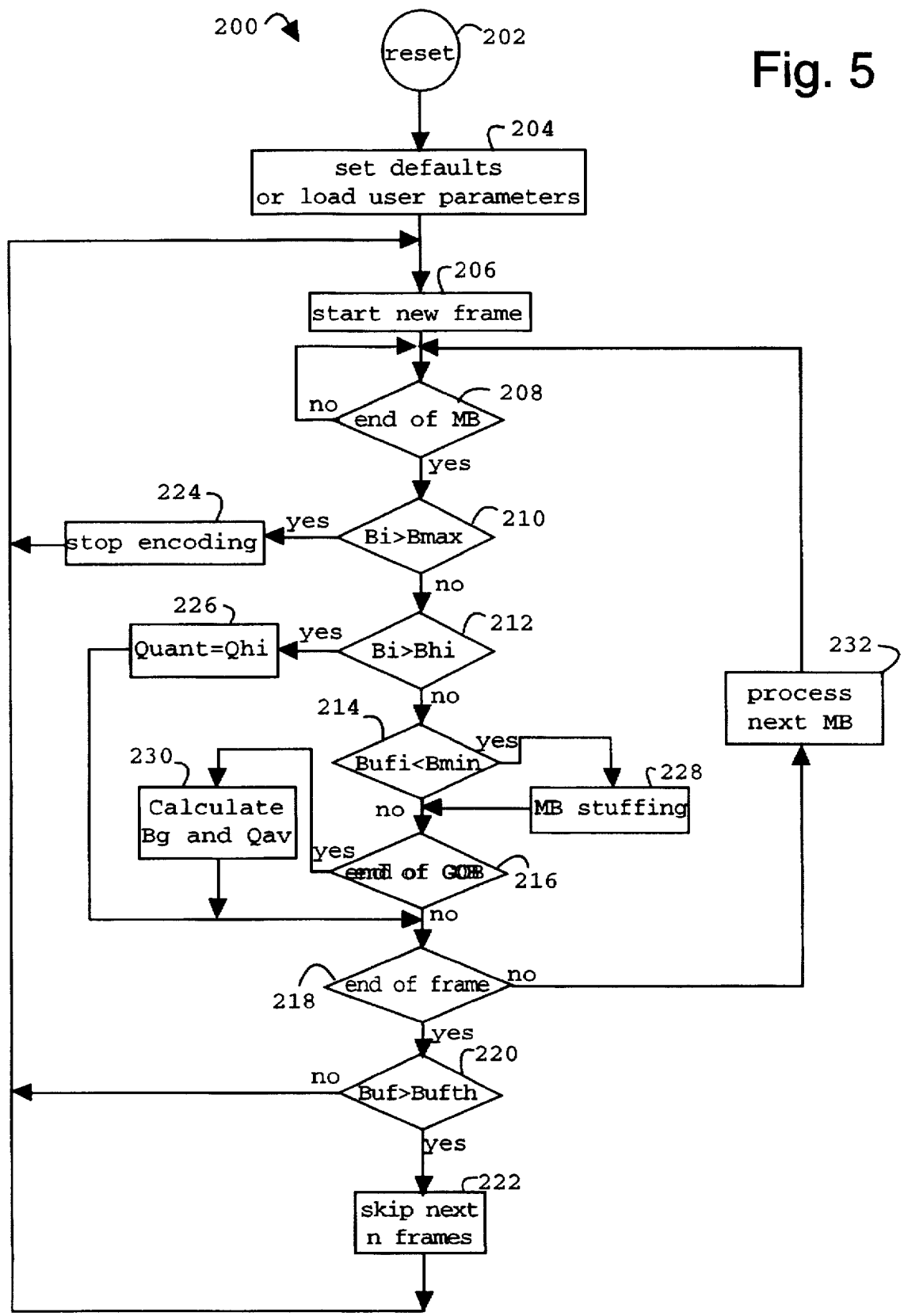
FIG. 5 is a flowchart of a rate buffer control method of the present invention included in the codec of FIGS. 2 and 3.

FIG. 5 illustrates the steps of a method 200 for rate buffer control. A step 202 begins at reset and inputs Rv, f and CIF. A step 204 loads default parameters, e.g., target number of bits per frame (Bf), buffer threshold to decide whether to drop next frame (Bufth) Buth=Rv*(1/f+Tenc)+Bmin, quantizer threshold (Qth) where frame drops if Quant>Qth (initially Quant=Qth), number of bits per frame at which to set Quant=Qhi (Bhi), Qhi, or user can load a quantizer look-up table (Q-LUT). Buffer maximum (Bmax) is 256K bits for CIF and 64K bits for QCIF. Buffer minimum (Bmin) is 493 bits. A step 206 starts a new frame process. A step 208 tests for the end of a macroblock (MB). A step 210 tests the number of bits generated in the current frame up to the i-th MB. A step 212 tests for Bi>Bhi. The buffer content at the i-th MB (Bufi) is tested in a step 214 with Bufi<Bmin. The number of bits used in the last 12(3) GOBs is Bg. A step 216 tests for the end of GOB. A step 218 tests for the end of frame. A step 220 checks to see if the buffer content at the end of the frame (Buf) exceeds Bufth. A step 222 skips the next n frames. If the answer to step 210 is yes, a step 224 causes coding to stop until the next frame and returns control to step 206. If the answer in step 212 is yes, a step 226 sets Quant=Qhi and passes control ahead to step 218. If the answer in step 214 is yes, a step 228 does macroblock stuffing. If the answer in step 216 is yes, a step 230 calculates Bg and Qav and finds a new value for Quant from the look-up table. Control is then passed to step 218. If the answer in step 218 is no, a step 232 processes the next macroblock by passing control to step 208.

Figure 6:
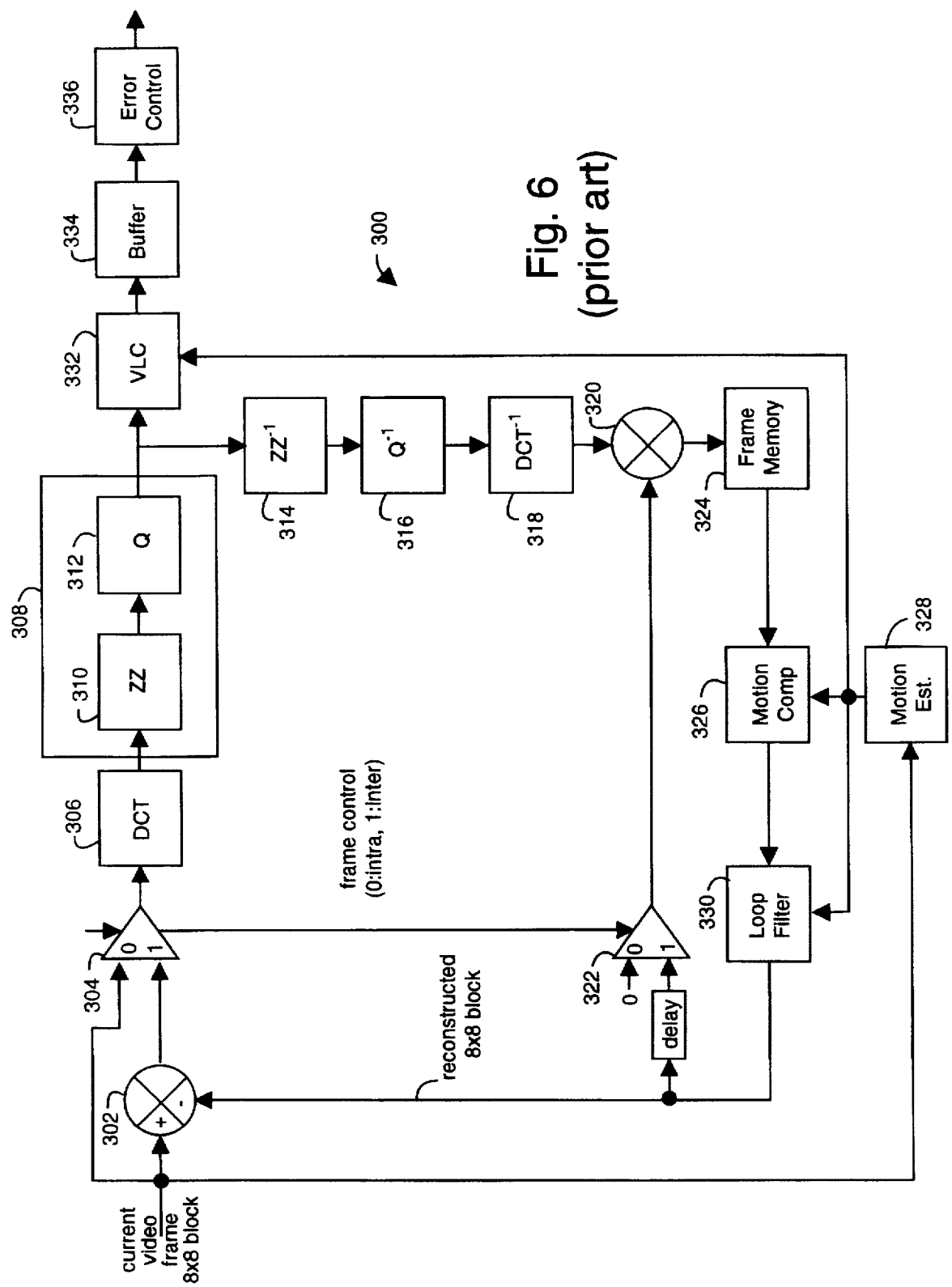
FIG. 6 is a prior flow diagram representing the functional connections of the "H.261" encoding process standard, which is implemented by a transmitting part of the video codec of FIG. 2.

FIG. 6 is a prior flow diagram representing the functional connections of the "H.261" encoding process standard, which is implemented by the video codec (FIG. 2) while in encoder mode. An encoder process 300 includes a differencer 302 that accepts eight-by-eight blocks of current video and reconstructed video. A summer 304 feeds a discrete cosine transform (DCT) process 306. A zigzag and quantizer (ZZQ) processor 308 includes a zigzag RAM memory (ZZ) 310 and a quantizer (Q) 312. The ZZQ processor 308 drives an inverse zigzag processor 314, an inverse quantizer 316 and an inverse DCT 318. These, in turn feed a mixer 320 from a summer 322 to supply a frame memory 324 (e.g., in DRAM 18). The motion processor (MP) 32 implements both a motion compensation processor 326 that accepts input from the frame memory 324 and a motion estimator 328. A two-dimensional loop filter 330 supplies a delayed signal to the summer 322 and differencer 302. The array of processors 70 is used to concurrently find any motion vectors between current macro-blocks and previous macroblocks.

Figure 7:
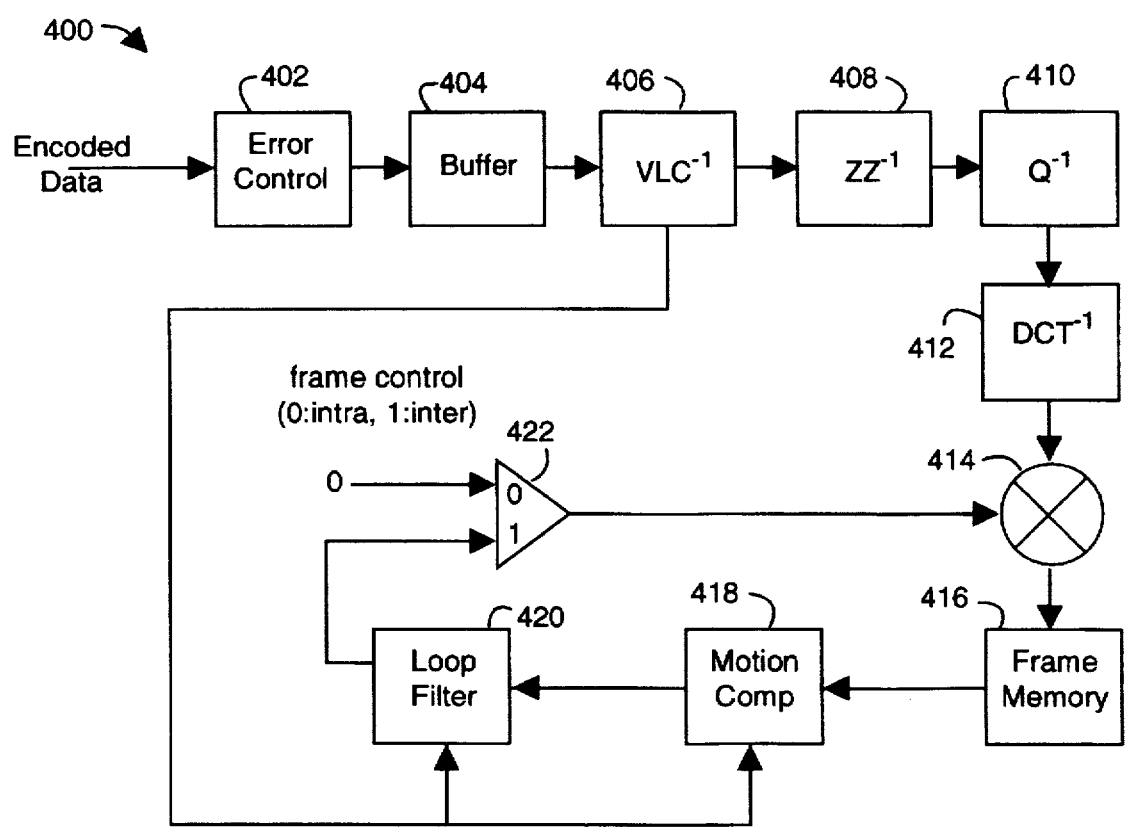
FIG. 7 is a prior flow diagram representing the functional connections of the "H.261" standard decoding process, which is implemented by a receiving part of the video codec of FIG. 2.

FIG. 7 is a prior flow diagram representing the functional connections of the "H.261" standard decoding process, which is implemented by the video codec (FIG. 2) while in decoder mode. A decoder process 400 accepts the encoded data into an error controller 402. A buffer 404 supplies incoming data to an inverse variable length controller (VLC) 406, an inverse zigzag memory (ZZMEM) 408, an inverse quantizer 410, and an inverse DCT processor 412. A mixer 414 produces a decoded output which is copied to a frame memory 416, e.g., in DRAM 48. A motion compensator 418 receives a motion vector from the inverse VLC 406 and a decoded frame from the frame memory 416. A loop filter 420, receives the motion compensated frames and drives a summer 422 that receives intra/inter frame control.

Although the present invention has been described in terms of the presently preferred embodiment, it is to be understood that the disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. A video codec, comprising:

a single semiconductor chip providing for a video input connection from a camera and a video output connection to a monitor of decompressed data, and a transmit channel and a receive channel of compressed data;

an interface connected to the chip for external connection to a separate frame memory dynamic random access memory (DRAM) and that provides for interim storage of incoming and outgoing video data; and a video compressor/decompressor disposed fully within the chip and connected to compress video information received from said video input connection for output on said transmit channel, and connected to decompress video information received from said receive channel for output on said video output connection;

wherein, said compression of video information is by spatial de-correlation of intraframe information and temporal decorrelation of interframe information, and said transmit and receive channels have communication channel bit rates reduced by quantization and variable length coding.

2. The video codec of claim 1, wherein:

the video compressor/decompressor includes intraframe coding based on single frame information redundancy, with processing done on blocks of eight-by-eight pixels, and both the luminance and chrominance pixel blocks are transform coded by a discrete cosine transform that changes the pixels from spatial domain to frequency domain.

3. The video codec of claim 2, wherein:

the video compressor/decompressor includes processors for transform coefficients that are arranged in the order of increasing frequency to prepare for run-length coding, a quantizer with adjustable threshold used to increase the zero run to enhance the coding efficiency;

wherein said threshold is determined by a stepsize which can only be changed every n-number of macroblocks; and wherein, each of a series of frames is reconstructed using an inverse quantization, inverse zigzag operation, inverse discrete cosine transform.

4. The video codec of claim 3, wherein:

the video compressor/decompressor includes an inter-frame compression process that exploits the high correlations of temporally adjacent frames, and motion estimation of two sequential frames with motion vectors that are then included in an encoded bit stream of said transmit and receive channels.

5. The video codec of claim 1, wherein:

the video compressor/decompressor includes a process for comparing the macroblocks for the current frame at a time "t" with the macroblocks of a previous frame "t−1", and a displacement vector within a defined search window that provides a minimum cost function, which can be as simple as an absolute difference, is the motion vector and is encoded by variable length coding;

wherein, motion estimation is provided for luminance data only, and motion vectors for chrominance data is about one-half of that for luminance data, for a particular macroblock of four luminance blocks and two chrominance blocks, such that a frame at "t−1" is motion-compensated using newly-computed motion vectors for both luminance and chrominance, and a motion-compensated frame "t−1" passed through an optional loop filter, is compared with a current frame "t";

wherein, the difference between a current frame "t" and a reconstructed frame "t−1" is discrete-cosine-transform encoded, processed for zigzag and quantizer, and decoded with the inverse functions, and the decoded differences are added to motion-compensation to form a reconstructed current frame that is used for a motion estimation of the next frame "t+1".

6. The video codec of claim 1, wherein:

the video compressor/decompressor includes decoding that is the opposite of encoding;

wherein a bit stream received on said receive channel is variable-length coded, and the length of each code-word is determined, segmented and decoded;

wherein, a frame start, a group-of-block start and a macroblock start are used for triggers wherein, intra-type macroblocks are decoded using inverse zigzag, inverse quantizer and inverse discrete cosine transform and sent out and stored in said frame memory DRAM;

wherein, inter-type macroblocks include a decoded motion vector used for motion-compensation of a macroblock in a previous frame "t−1", and simultaneously the differences between "t" and "t−1" are decoded using inverse quantizer, zigzag and discrete cosine transform; and wherein, said decoded differences are added to a motion-compensated macroblock, to reconstruct a macroblock for a current frame "t" and stored in said frame memory DRAM for reconstructing a next frame "t+1".

7. The video codec of claim 1, further comprising:

a framing processor connected between the video compressor/decompressor and each of said transmit channel and receive channel;

wherein the framing processor includes an encoder to generate a forward-error-correction code within an outgoing error-correction-framing pattern in a transmitted bit stream directed to said transmit channel, and further includes a decoder to relock timing when timing lock is lost for an incoming error-correction-framing pattern in a received bit stream from said receive channel.

8. A single-chip video codec for full-duplex communication of thirty frame per second video, comprising:

a single semiconductor integrated circuit (IC) with external connections provided for a dynamic random access memory (DRAM), a video source input, a video output, a transmit communications channel, a receive communications channel and a host buss for initialization and chip status communication;

a memory controller fully disposed on the IC and having a connection to control an external memory module;

resource sharing means fully disposed on the IC and connected to both an encoding bit stream and a decoding bit stream that flow through said external memory module for simultaneous video compression and decompression;

said external memory module provides for segment storage of video compression and decompression frames, a transmit buffer and a receive buffer, and the memory controller includes means for user-programmable segment-storage sizes in said external memory module;

a pipelined discrete cosine transform and quantization (DCTQ) means fully disposed on the IC and for producing one coefficient every two clock cycles in said video bitstreams and including matrix decomposition means for reducing a required number of multiplications and additions, wherein said DCTQ means performs both forward and inverse discrete cosine transform;

motion-prediction means fully disposed on the IC and connected to said bitstreams and having an array of parallel-processing elements and multiport memories providing for full search of motion vectors, and means for accepting user-programmable weights input for motion estimation smoothing, wherein motion-compensated prediction is provided for both compression and decompression, for a type-inter or a type-intra compression decision, and for whether a loop filter should be on, and storage for a user-programmable bias;

an on-chip microcomputer (CPU) fully disposed on the IC and for concurrent processing of said compression and decompression bitstreams with on-chip parameter busses for both address and data which allow addressing and parameter passing;

direct communication channel connection means fully disposed on the IC and connected to said bitstreams and means for assigning different bit rates to said channels wherein spatial and temporal resolutions are automatically adjusted;

host-programmable means in the DCTQ means for adaptive quantization and rate buffer control providing for the optimization of a variety of applications with individual environments, wherein problematic portions of each frame are favored with a disproportionate share of said compressed bitstreams to reduce compression artifact generation;

an on-chip register file fully disposed on the IC and providing for real-time monitoring and control of the compression and decompression of said bitstreams; and video input and output means for pipelined encoding and decoding of macroblocks of video information providing for a minimization of throughput delays.

9. A video codec, comprising:

a single semiconductor chip providing for a video input connection from a camera and a video output connection to a monitor of decompressed data, and a transmit channel and a receive channel of compressed data;

an interface connected to the chip for external connection to a separate frame memory dynamic random access memory (DRAM) and provides for interim storage of incoming and outgoing video data;

a video compressor/decompressor disposed fully within the chip and connected to compress video information received from said video input connection to be output on said transmit channel, and connected to decompress video information received from said receive channel to be output on said video output connection;

wherein, said compression of video information is by spatial de-correlation of intraframe information, and temporal decorrelation of interframe information, and said transmit and receive channels have communication channel bit rates reduced by quantization and variable length coding;

wherein, the video compressor/decompressor includes intraframe coding that uses the redundancy of information within a single frame, the processing is done on blocks of eight-by-eight pixels, and both the luminance and chrominance pixel blocks are transform coded by a discrete cosine transform that changes the pixels from spatial domain to frequency domain;

wherein, the video compressor/decompressor includes transform coefficients that are arranged in the order of increasing frequency to prepare for run-length coding, a quantizer with adjustable threshold used to increase the zero run to enhance the coding efficiency;

wherein, said threshold is determined by a stepsize which can only be changed every n-number of macroblocks; and wherein, each of a series of frames is reconstructed using an inverse quantization, an inverse zigzag operation, and an inverse discrete cosine transform.

10. The video codec of claim 9, wherein:

the video compressor/decompressor includes interframe compression that exploits the high correlations of temporally adjacent frames, and motion estimation of two sequential frames with motion vectors that are then included in an encoded bit stream of said transmit and receive channels.

11. A video codec, comprising:

a single semiconductor chip providing for a video input connection from a camera and a video output connection to a monitor of decompressed data, and a transmit channel and a receive channel of compressed data;

an interface connected to the chip for external connection to a separate frame memory dynamic random access memory (DRAM) and provides for interim storage of incoming and outgoing video data;

a video compressor/decompressor disposed fully within the chip and connected to compress video information received from said video input connection to be output on said transmit channel, and connected to decompress video information received from said receive channel to be output on said video output connection;

wherein, said compression of video information is by spatial de-correlation of intraframe information, and temporal decorrelation of interframe information, and said transmit and receive channels have communication channel bit rates reduced by quantization and variable length coding;

wherein, the video compressor/decompressor compares the macroblocks for the current frame at a time "t" with the macroblocks of a previous frame "t−1", and a displacement vector within a defined search window that provides a minimum cost function, which can be as simple as an absolute difference, is the motion vector and is encoded by variable length coding;

wherein, motion estimation is provided for luminance data only, and motion vectors for chrominance data is about one-half of that for luminance data, for a particular macroblock of four luminance blocks and two chrominance blocks, such that a frame at "t−1" is motion-compensated using newly-computed motion vectors for both luminance and chrominance, and a motion-compensated frame "t−1" passed through an optional loop filter, is compared with a current frame "t"; and wherein, the difference between a current frame "t" and a reconstructed frame "t−1" is discrete-cosine-transform encoded, processed for zigzag and quantizer, and decoded with the inverse functions, and the decoded differences are added to motion-compensation to form a reconstructed current frame that is used for a motion estimation of the next frame "t+1".

12. A video codec, comprising:

a single semiconductor chip providing for a video input connection from a camera and a video output connection to a monitor of decompressed data, and a transmit channel and a receive channel of compressed data;

an interface connected to the chip for external connection to a separate frame memory dynamic random access memory (DRAM) and provides for interim storage of incoming and outgoing video data;

a video compressor/decompressor disposed fully within the chip and connected to compress video information received from said video input connection to be output on said transmit channel, and connected to decompress video information received from said receive channel to be output on said video output connection;

wherein, said compression of video information is by spatial de-correlation of intraframe information, and temporal decorrelation of interframe information, and said transmit and receive channels have communication channel bit rates reduced by quantization and variable length coding;

wherein, the video compressor/decompressor includes decoding that is the opposite of encoding;

wherein a bit stream received on said receive channel is variable-length coded, and the length of each codeword is determined, segmented and decoded;

wherein, a frame start, a group-of-block start and a macroblock start are used for triggers;

wherein, intra-type macroblocks are decoded using inverse zigzag, inverse quantizer and inverse discrete cosine transform and sent out and stored in said frame memory DRAM;

wherein, inter-type macroblocks include a decoded motion vector used for motion-compensation of a macroblock in a previous frame "t−1", and simultaneously the differences between "t" and "t−1" are decoded using inverse quantizer, zigzag and discrete cosine transform; and wherein, said decoded differences are added to a motion-compensated macroblock, to reconstruct a macroblock for a current frame "t" and stored in said frame memory DRAM for reconstructing a next frame "t+1".

* * * * *

UNITED STATES PATENT AND TRADEMARK OFFICE
CERTIFICATE OF CORRECTION

PATENT NO. : 5,781,788
DATED : 07-14-98
INVENTOR(S) : Beng-Yu Woo; Xiaoming Li; Vivian Hsiun It is certified that error appears in the above-indentified patent and that said Letters Patent is hereby corrected as shown below:

Page 1, Title Page - Title of invention should read:
    "FULL DUPLEX SINGLE CHIP VIDEO CODEC"

Page 10, Col. 1, line 1 - Title of invention should read:
    "FULL DUPLEX SINGLE CHIP VIDEO CODEC"

Signed and Sealed this

Twenty-ninth Day of September, 1998

Attest:

BRUCE LEHMAN

Attesting Officer        Commissioner of Patents and Trademarks

(12) EX PARTE REEXAMINATION CERTIFICATE (6087th)
United States Patent
Woo et al.

(10) Number: US 5,781,788 C1
(45) Certificate Issued: Jan. 8, 2008

(54) FULL DUPLEX SINGLE CHIP VIDEO CODEC

(75) Inventors: Beng-Yu Woo, Los Altos Hills, CA (US); Xiaoming Li, Yorktown Heights, NY (US); Vivian Hsiun, Palo Alto, CA (US)

(73) Assignee: Advanced Video Technologies LLC, Suffern, NY (US)

Reexamination Request:
No. 90/007,145, Jul. 27, 2004

Reexamination Certificate for:
Patent No.: 5,781,788
Issued: Jul. 14, 1998
Appl. No.: 08/939,997
Filed: Sep. 29, 1997

Certificate of Correction issued Sep. 29, 1998.

Related U.S. Application Data

(63) Continuation of application No. 08/437,276, filed on May 8, 1995, now abandoned.

(51) Int. Cl.
*G06T 9/00* (2006.01)
*H04N 7/26* (2006.01)
*H04N 7/50* (2006.01)

(52) U.S. Cl. ............................ 712/1; 370/276; 370/278; 370/282; 375/E7.093; 375/E7.094; 375/E7.211

(58) Field of Classification Search ............. 375/240.15
See application file for complete search history.

(56) References Cited

U.S. PATENT DOCUMENTS

| 4,823,201 A | | 4/1989 | Simon et al. |
| 5,134,478 A | | 7/1992 | Golin |
| 5,216,516 A | * | 6/1993 | Tanaka et al. ............... 382/248 |
| 5,253,078 A | * | 10/1993 | Balkanski et al. .......... 382/250 |
| 5,289,577 A | | 2/1994 | Gonzales et al. |
| 5,340,978 A | | 8/1994 | Rostoker et al. |
| 5,358,886 A | | 10/1994 | Yee et al. |
| 5,379,351 A | | 1/1995 | Fandrianto et al. |
| 5,412,435 A | * | 5/1995 | Nakajima ................... 348/699 |
| 5,440,345 A | * | 8/1995 | Shimoda ................ 375/240.14 |
| 5,452,466 A | * | 9/1995 | Fettweis ....................... 712/36 |
| 5,468,069 A | | 11/1995 | Prasanna et al. |

(Continued)

OTHER PUBLICATIONS

Bose et al., "A Single Chip Multistandard Video CODEC", IEEE 1993 Custom Integrated Circuits Conference, Mar. 1993, pp. 11.4.1–11.4.4.

(Continued)

*Primary Examiner*—David E. Harvey

(57) ABSTRACT

A single-chip video compression/decompression (video codec) chip is connected to receive a video input from a NTSC-compatible or PAL-compatible camera and a transmit channel. Video information from the camera or other video input source is compressed by the video codec and transmitted out in compressed form on a transmit channel. Concurrently, compressed video information is input to the video codec from a receive channel, decompressed and output to the monitor or other video output device, e.g., a television set. Only a separate single module of dynamic random access memory (DRAM) is needed to provide storage for incoming and outgoing video data, compressed bit streams and reconstructed pictures for both compression and decompression procedures. The compression of video information is by spatial decorrelation of the intraframe information, and temporal decorrelation of the interframe information. The communication channel bit rate is further reduced by the quantization and variable length coding. Intraframe coding uses the redundancy of information within a single frame. The processing is done on blocks of eight-by-eight pixels. Both the luminance and chrominance pixel blocks are transform coded by a discrete cosine transform that changes the pixels from spatial domain to frequency domain.

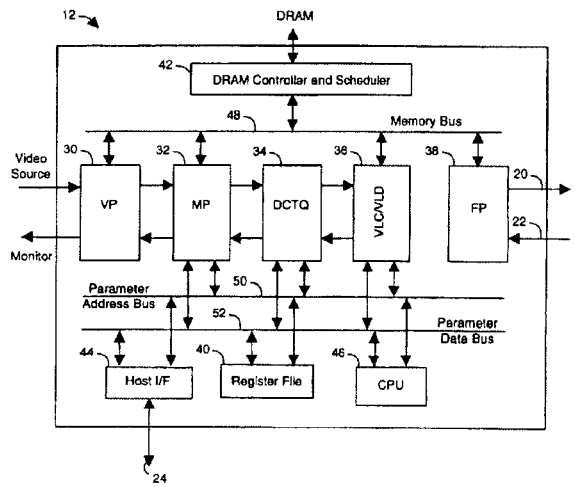

U.S. PATENT DOCUMENTS

| | | | |
|---|---|---|---|
| 5,485,214 A | * | 1/1996 | Lin et al. .................. 348/416.1 |
| 5,491,515 A | * | 2/1996 | Suzuki .................... 348/401.1 |
| 5,581,205 A | | 12/1996 | Sugibayashi |
| 5,598,514 A | | 1/1997 | Purcell et al. |
| 5,680,482 A | * | 10/1997 | Liu et al. .................... 382/233 |
| 5,703,651 A | | 12/1997 | Kim et al. |
| 5,708,659 A | | 1/1998 | Rostoker et al. |
| 5,856,975 A | | 1/1999 | Rostoker et al. |
| 5,870,497 A | | 2/1999 | Galbi et al. |
| 5,872,784 A | | 2/1999 | Rostoker et al. |
| 6,263,026 B1 | * | 7/2001 | Je-Chang et al. ...... 375/240.23 |

OTHER PUBLICATIONS

Harrand et al., "A Single Chip Videophone Encoder/Decoder", ISSCC95/Session 17/Video Signal Processing/Paper FA 17.4, Feb. 1995 (2 pages).

C–Cube Microsystems, http://web.archive.org/web/19961031030821/www.c–cube.com/prdctlst/prodinfo.html, web page, date unknown.

C–Cube Microsystems, "12 CLM4100 Multimedia Accelerators", date unknown, pp. 1–18.

C–Cube Microsystems, "13 CLM4200H H.261 Video Codec", date unknown, pp. 127–132.

Gove, "The MVP : A Highly Integrated Video Compression Chip"; Data Compression Conference, 1994, DCC '94. Proceedings; Mar. 29–31, 1994; 215–24.

* cited by examiner

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1, 2 and 8–12 are cancelled.

Claims 3 and 5–7 are determined to be patentable as amended.

Claim 4, dependent on an amended claim, is determined to be patentable.

New claims 13–26 are added and determined to be patentable.

3. The video codec of claim [2] *13*, wherein:
the video compressor/decompressor includes processors for transform coefficients that are arranged in the order of increasing frequency to prepare for run-length coding, a quantizer with the adjustable threshold used to increase the zero run to enhance the coding efficiency;
wherein said threshold is determined by a stepsize which can only be changed every n-number of macroblocks; and
wherein, each of a series of frames is reconstructed using an inverse quantization, inverse zigzag operation, inverse discrete cosine transform.

5. [The video codec of claim 1, wherein:] *A video codec, comprising:*
*a single semiconductor chip providing for a video input connection from a camera and a video output connection to a monitor of decompressed data, and a transmit channel and a receive channel of compressed data;*
*an interface connected to the chip for external connection to a separate frame memory dynamic random access memory (DRAM) and that provides for interim storage of incoming and outgoing video data, wherein the incoming video data is video input data from the video input connection; and*
*a video compressor/decompressor disposed fully within the chip and connected to compress video information received from said video input connection for output on said transmit channel, and connected to decompress video information received from said receive channel for output on said video output connection;*
*wherein, said compression of video information is by spatial de-correlation of intraframe information and temporal decorrelation on interframe information, and said transmit and receive channels have communication channel bit rates reduced by quantization and variable length coding; and*
*wherein* the video compressor/decompressor includes a process for comparing the macroblocks for the current frame at a time "t" with the macroblocks of a previous frame "t–1", and a displacement vector within a defined search window that provides a minimum cost function, which can be as simple as an absolute difference, is the motion vector and is encoded by variable length coding;
wherein, motion estimation is provided for luminance data only, and motion vectors for chrominance data is about one-half of that for luminance data, for a particular macroblock of four luminance blocks and two chrominance blocks, such that a frame at "t–1" is motion-compensated using newly-computed motion vectors for both luminance and chrominance, and a motion-compensated frame "t–1" passed through an optional loop filter, is compared with a current frame "t";
wherein, the difference between a current frame "t" and reconstructed frame "t–1" is discrete-cosine-transform encoded, processed for zigzag and quantizer, and decoded with the inverse functions, and the decoded differences are added to motion-compensation to form a reconstructed current frame that is used for a motion estimation of the next frame "t+1"; *and*
*wherein the video compressor/decompressor includes dedicated hardware logic which performs forward discrete cosine transforms on the video information received from the video input connection and wherein the same dedicated hardware logic also performs inverse discrete cosine transforms on the video information received from the receive channel.*

6. [The video codec of claim 1, wherein:] *A video codec, comprising:*
*a single semiconductor chip providing for a video input connection from a camera and a video output connection to a monitor of decompressed data, and a transmit channel and a receive channel of compressed data;*
*an interface connected to the chip for external connection to a separate frame memory dynamic random access memory (DRAM) and that provides for interim storage of incoming and outgoing video data, wherein the incoming video data is video input data from the video input connection; and*
*a video compressor/decompressor disposed fully within the chip and connected to compress video information received from said video input connection for output on said transmit channel, and connected to decompress video information received from said receive channel for output on said video output connection;*
*wherein, said compression of video information is by spatial de-correlation of intraframe information and temporal decorrelation on interframe information, and said transmit and receive channels have communication channel bit rates reduced by quantization and variable length coding; and*
*wherein* the video compressor/decompressor includes decoding that is the opposite of encoding;
wherein a bit stream received on said receive channel is variable-length coded, and the length of each codeword is determined, segmented and decoded;
wherein, a frame start, a group-of-block start and a macroblock start are used for triggers wherein, intra-type macroblocks are decoded using inverse zigzag, inverse quantizer and inverse discrete cosine transform and sent out and stored in said frame memory DRAM;
wherein, inter-type macroblocks include a decoded motion vector used for motion-compensation of a macroblock in a previous frame "t–1", and simultaneously the differences between "t" and "t–1" are decoded using inverse quantizer, zigzag and discrete cosine transform; and wherein, said decoded differences are added to a motion-compensated macroblock, to reconstruct a macroblock for a current frame "t" and stored in said frame memory DRAM for reconstructing a next frame "t+1"; *and*

*wherein the video compressor/decompressor includes dedicated hardware logic which performs forward discrete cosine transforms on the video information received from the video input connection and wherein the same dedicated hardware logic also performs inverse discrete cosine transforms on the video information received from the receive channel.*

7. [The video codec of claim 1, further comprising:] *A video codec, comprising:*

*a single semiconductor chip providing for a video input connection from a camera and a video output connection to a monitor of decompressed data, and a transmit channel and a receive channel of compressed data;*

*an interface connected to the chip for external connection to a separate frame memory dynamic random access memory (DRAM) and that provides for interim storage of incoming and outgoing video data; and*

*a video compressor/decompressor disposed fully within the chip and connected to compress video information received from said video input connection for output on said transmit channel, and connected to decompress video information received from said receive channel for output on said video output connection;*

*wherein, said compression of video information is by spatial de-correlation of intraframe information and temporal decorrelation on interframe information, and said transmit and receive channels have communication channel bit rates reduced by quantization and variable length coding; and*

*wherein a framing processor is connected between the video compressor/decompressor and each of said transmit channel and receive channel; and*

*wherein the framing processor includes an encoder to generate a forward-error-correction code within an outgoing error-correction-framing pattern in a transmitted bit stream directed to said transmit channel, and further includes a decoder to relock timing when timing lock is lost for an incoming error-correction-framing pattern in a received bit stream from said receive channel; and*

*wherein the video compressor/decompressor includes dedicated hardware logic which performs forward discrete cosine transforms on the video information received from the video input connection and wherein the same dedicated hardware logic also performs inverse discrete cosine transforms on the video information received from the receive channel.*

*13. A video codec, comprising:*

*a single semiconductor chip providing for a video input connection from a camera and a video output connection to a monitor of decompressed data, and a transmit channel and a receive channel of compressed data;*

*an interface connected to the chip for external connection to a separate frame memory dynamic random access memory (DRAM) and that provides for interim storage of incoming and outgoing video data, wherein the incoming video data is video input data from the video input connection; and*

*a video compressor/decompressor disposed fully within the chip and connected to compress video information received from said video input connection for output on said transmit channel, and connected to decompress video information received from said receive channel for output on said video output connection;*

*wherein, said compression of video information is by spatial de-correlation of intraframe information and temporal decorrelation on interframe information, and said transmit and receive channels have communication channel bit rates reduced by quantization and variable length coding; and*

*wherein the video compressor/decompressor includes dedicated hardware logic which performs forward discrete cosine transforms on the video information received from the video input connection and wherein the same dedicated hardware logic also performs inverse discrete cosine transforms on the video information received from the receive channel.*

*14. The video codec of claim 13, wherein the same dedicated hardware logic also performs zigzag operations on the video information received from the video input connection and inverse zigzag operations on the video information received from the receive channel.*

*15. The video codec of claim 14, wherein the same dedicated hardware logic also performs quantization on the video information received from the video input connection and inverse quantization on the video information received from the receive channel.*

*16. The video codec of claim 13, wherein the single engine further performs zigzag operations on the video information received from the video input connection and inverse zigzag operations on the video information received from the receive channel.*

*17. The video codec of claim 13, wherein the video codec generates an error code and wherein the error code is included with the compressed data.*

*18. The video codec of claim 17, wherein the video codec includes a framing processor connected between the video compressor/decompressor and the transmit and receive channels and wherein the framing processor generates the error code.*

*19. The video codec of claim 18, wherein the error code includes a forward error correction code and wherein the error code is included with the compressed data.*

*20. The video codec of claim 13, wherein the video compressor/decompressor generates transform coefficients based on the video information received from the video input connection, wherein the video compressor/decompressor includes a quantizer, and wherein the quantizer includes an adjustable threshold for increasing a run of zeros of the transform coefficients.*

*21. The video codec of claim 20, wherein said threshold is determined by a stepsize which is allowed to be modified only every n-number of macroblocks.*

*22. The video codec of claim 13, wherein the single semiconductor chip further includes a clock generator for generating a plurality of operating frequencies.*

*23. A video codec, comprising:*

*a single semiconductor chip providing for a video input connection from a camera and a video output connection to a monitor of decompressed data, and a transmit channel and a receive channel of compressed data;*

*an interface connected to the chip for external connection to a separate frame memory dynamic random access memory (DRAM) and that provides for interim storage of incoming and outgoing video data;* a dynamic random access memory (DRAM) in communication with the interface, wherein the DRAM includes segments for storage of video data compression and decompression frames, a transmit buffer and a receive buffer; and a video compressor/decompressor disposed fully within the chip and connected to compress video information received from said video input connection for output on said transmit channel, and connected to decompress video information received from said receive channel for output on said video output connection;

wherein, said compression of video information is by spatial de-correlation of intraframe information and temporal decorrelation on interframe information, and said transmit and receive channels have communication channel bit rates reduced by quantization and variable length coding; and wherein the video compressor/decompressor includes dedicated hardware logic which performs forward discrete cosine transforms on the video information received from the video input connection and wherein the same dedicated hardware logic also performs inverse discrete cosine transforms on the video information received from the receive channel.

24. The video codec of claim 23, further comprising a memory controller in communication with the DRAM and the video compressor/decompressor, wherein each of the segments have a size associated therewith, and wherein the size of at least one of the segments is configurable.

25. A video codec, comprising:

a single semiconductor chip providing for a video input connection from a camera and a video output connection to a monitor of decompressed data, and a transmit channel and a receive channel of compressed data;

an interface connected to the chip for external connection to a separate frame memory dynamic random access memory (DRAM) and that provides for interim storage of incoming and outgoing video data; and a video compressor/decompressor disposed fully within the chip and connected to compress video information received from said video input connection for output on said transmit channel, and connected to decompress video information received from said receive channel for output on said video output connection;

wherein, said compression of video information is by spatial de-correlation of intraframe information and temporal decorrelation on interframe information, and said transmit and receive channels have communication channel bit rates reduced by quantization and variable length coding;

wherein the video compressor/decompressor includes dedicated hardware logic which performs forward discrete cosine transforms on the video information received from the video input connection and wherein the same dedicated hardware logic also performs inverse discrete cosine transforms on the video information received from the receive channel; and wherein the video compressor/decompressor includes a motion prediction processor for the temporal decorelation of the inter-frame compression, and wherein the motion predictor accepts programmable weights to smooth motion estimation.

26. A video codec, comprising:

a single semiconductor chip providing for a video input connection from a camera and a video output connection to a monitor of decompressed data, and a transmit channel and a receive channel of compressed data;

an interface connected to the chip for external connection to a separate frame memory dynamic random access memory (DRAM) and that provides for interim storage of incoming and outgoing video data, wherein the incoming video data is video input data from the video input connection; and a video compressor/decompressor disposed fully within the chip and connected to compress video information received from said video input connection for output on said transmit channel, and connected to decompress video information received from said receive channel for output on said video output connection;

wherein, said compression of video information is by spatial de-correlation of intraframe information and temporal decorrelation on interframe information, and said transmit and receive channels have communication channel bit rates reduced by quantization and variable length coding; and wherein motion estimation is provided for the luminance pixel blocks, and motion vectors for chrominance data is about one-half of that for luminance data.

* * * * *